Oct. 27, 1942. R. L. MATTSON 2,299,915
GEAR CUTTING APPARATUS
Filed Feb. 20, 1939 4 Sheets-Sheet 1
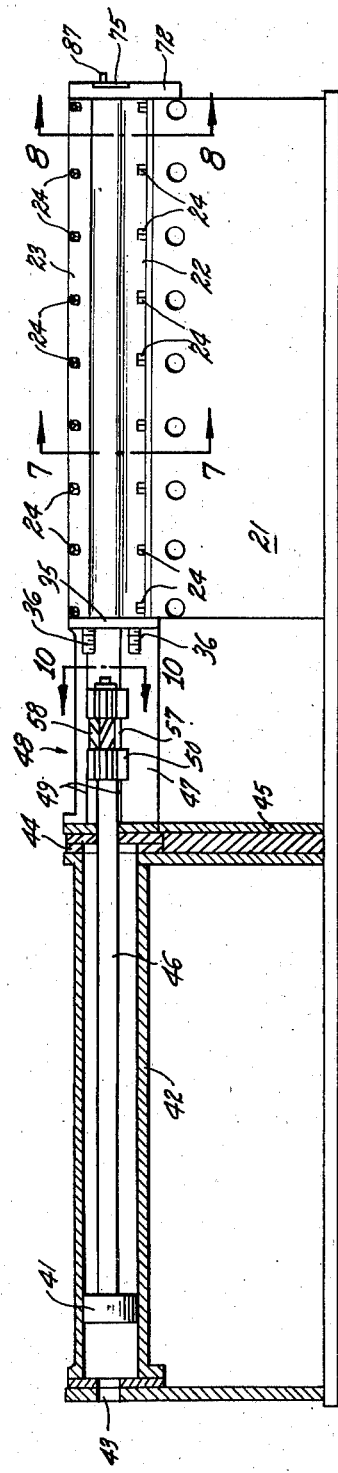
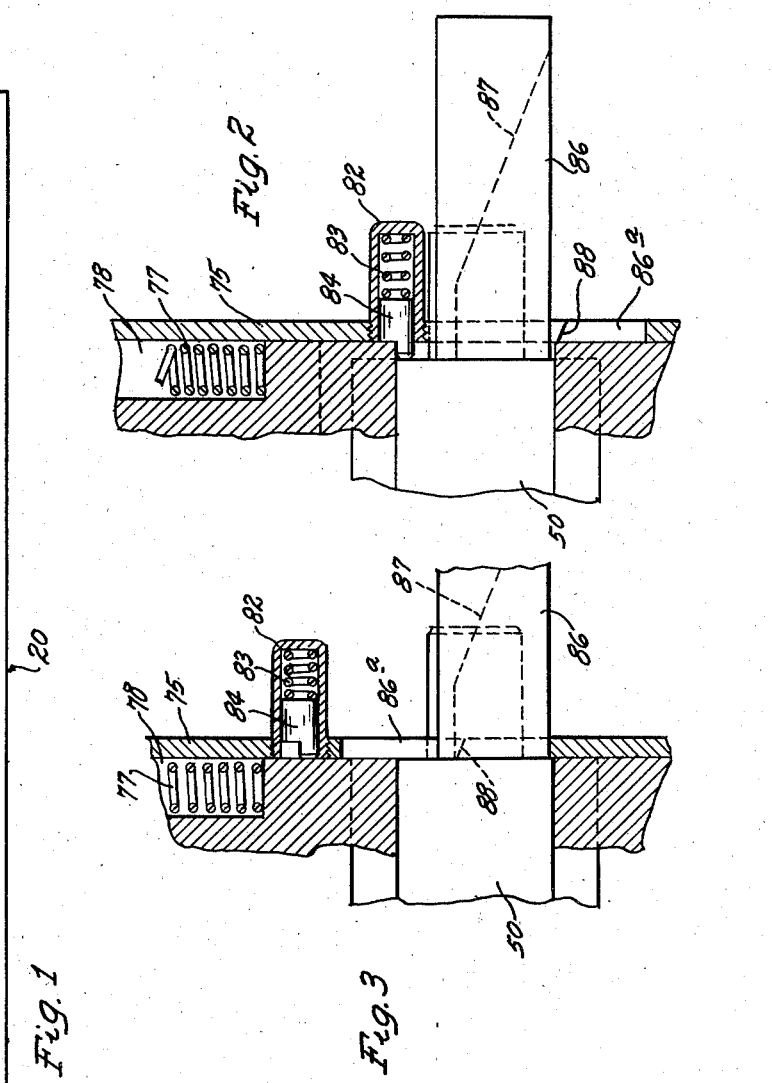
Inventor
RAYMOND L. MATTSON.
By
Attorneys.

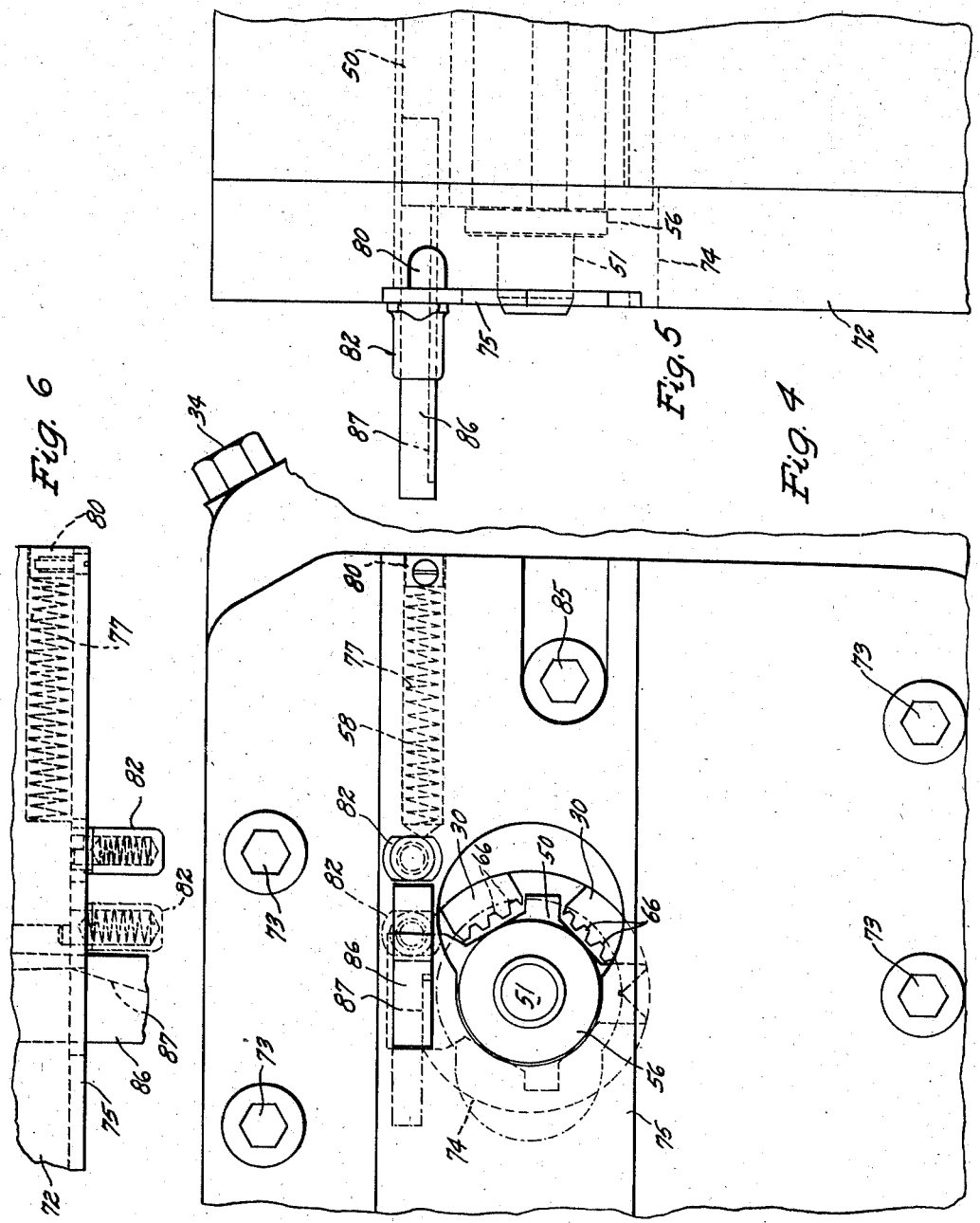

Oct. 27, 1942. R. L. MATTSON 2,299,915
GEAR CUTTING APPARATUS
Filed Feb. 20, 1939 4 Sheets-Sheet 3
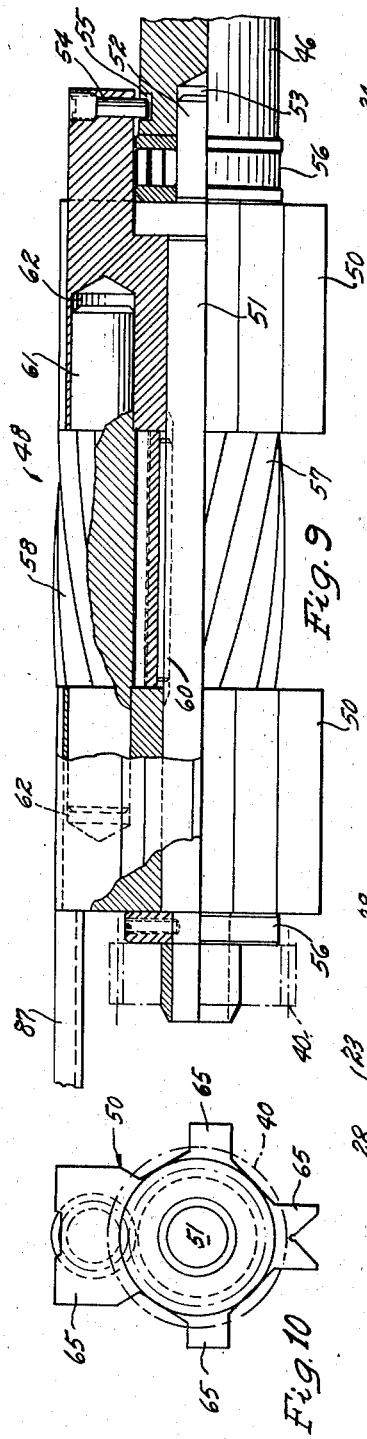
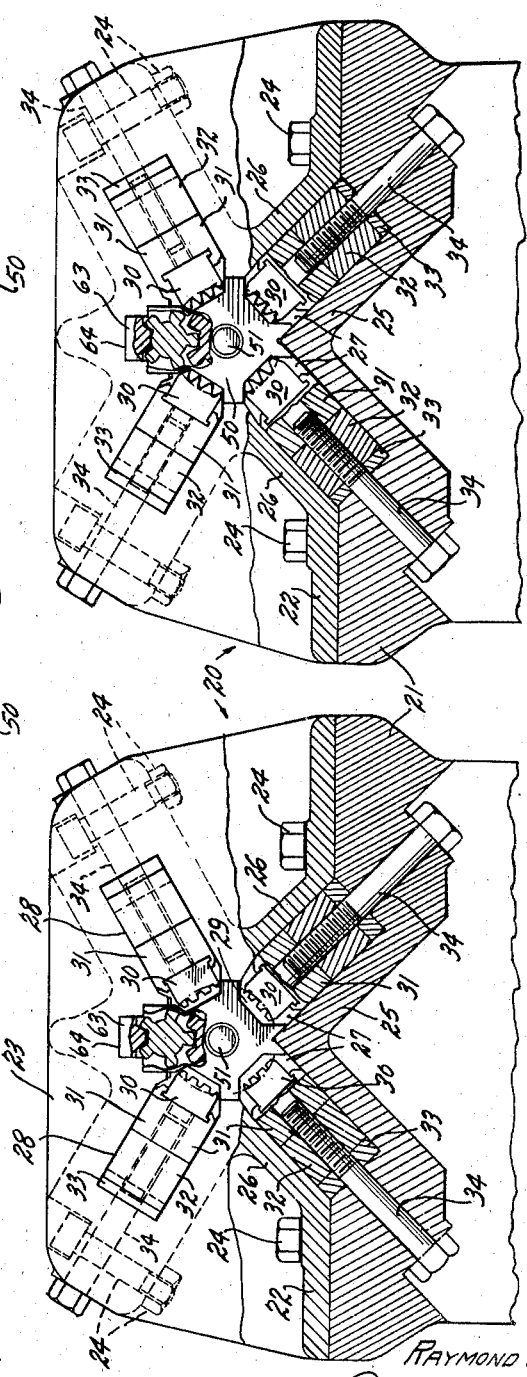
Inventor
RAYMOND L. MATTSON.
By
Attorneys Oct. 27, 1942.   R. L. MATTSON   2,299,915
GEAR CUTTING APPARATUS
Filed Feb. 20, 1939   4 Sheets-Sheet 4

Inventor
RAYMOND L. MATTSON.
By
Attorneys

Patented Oct. 27, 1942

2,299,915

UNITED STATES PATENT OFFICE 2,299,915

GEAR CUTTING APPARATUS

Raymond L. Mattson, Detroit, Mich.

Application February 20, 1939, Serial No. 257,297

8 Claims. (Cl. 90—10)

This invention relates generally to gear cutting apparatus and more particularly to a spiral gear cutting machine.

One of the objects of the present invention is to provide a new and improved spiral gear cutting machine which is efficient in operation and which is adapted for high production of gears.

Another object of the invention is to provide a machine of the above mentioned character embodying the advantages of a broaching process.

Another object of the invention is to provide a generating broaching machine which is efficient in operation, requires less frequent attention with respect to sharpening of the tools, is simple in construction having a minimum of operating parts and is inexpensive to manufacture.

Other objects of the invention will become apparent from the following description taken in connection with the accompanying drawings which form a part of this specification and in which, Figure 1 is a side view partly in elevation and partly in section of my improved gear cutting machine;

Fig. 2 is a fragmentary view partly in top plan and partly in section of one end of the machine including unloading mechanism for unloading the finished gears;

Fig. 3 is a view similar to Fig. 2 showing the operating parts in positions they will assume on unloading of a finished gear;

Fig. 4 is a fragmentary elevational end view of the discharge or unloading end of the machine;

Fig. 5 is a fragmentary side elevational view of the machine looking from right to left at Fig. 7;

Fig. 6 is a fragmentary top plan view of the discharge end of the machine;

Fig. 7 is a view partly in elevation and partly in cross section of the machine, taken along the line and in the direction of the arrows 7—7 of Fig. 1;

Fig. 8 is a view similar to Fig. 7 taken along the line and in the direction of the arrows 8—8 of Fig. 1;

Fig. 9 is a view partly in side elevation and broken away showing parts in section of a gear blank carriage of the machine;

Fig. 10 is an end elevational view of the carriage taken in the direction of the arrows 10—10 of Fig. 1;

Figure 11:
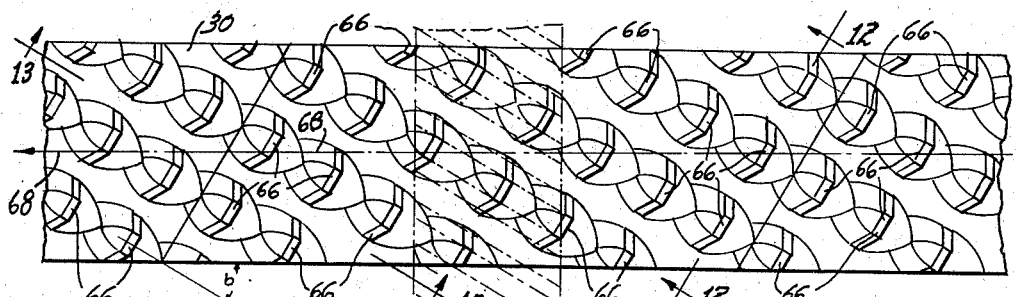
Fig. 11 is a plan view of cutting elements of the machine.

Referring to the drawings by characters of reference, the machine embodying my invention includes an elongated supporting structure 20 which may comprise a base 21, a lower casting 22 and an upper casting 23, the castings being mounted on one end portion of the base and being rigidly secured together and to the base by nuts and bolts 24. The base 21, Figs. 7 and 8, is provided with an upwardly directed, V-shaped wall portion 25 which projects between and is spaced from upwardly converging walls 26 of the lower casting 22 providing elongated recesses 27, extending longitudinally of the supporting structure, and the upper and lower castings are formed to cooperate in providing a pair of similar elongated recesses 28, these recesses 27, 28 as seen from an end view of the structure, being radially spaced and opening into a central passage 29 which extends longitudinally of the structure.

Figure 14:
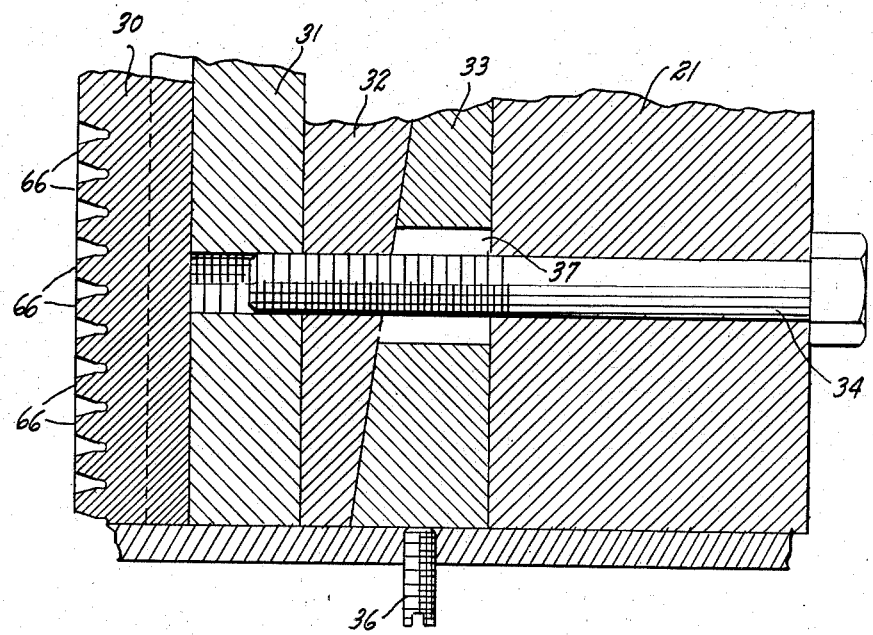
Fig. 14 is a detail sectional view of adjusting means for the cutting elements.

Mounted in the recesses 27, 28 are gear blank cutting tools or broaches 30 which are radially spaced, as seen from an end view of the machine and these broaches project into the passage 29 through which a gear blank travels during the cutting or broaching operation, as will later be seen. Preferably each of the radially disposed cutting tools comprises a plurality of rectangular plate-like broaches arranged in end to end abutting relation, longitudinally of the passage 29. The broaches 30 are rigidly secured to holders 31, positioned in the recesses 27 and interposed between each holder and the inner end wall of each recess there is a fixed wedge 32 and a longitudinal movable wedge 33 which are cooperable for individually and radially adjusting the positions of the rows of broaches. Bolts 34, which extend through the wedges and screw thread into the broach holders 31, may be provided to hold the broaches in desired adjusted positions, it of course being necessary to loosen these bolts prior to adjusting the broaches. Substantially midway of the machine, the broaches terminate at an upright wall 35 of the base and screwthreaded into the wall 35 adjustment screws 36 may be provided for moving the wedges 33 to adjust the broaches 30, the wedges 33 being provided with clearance slots 37 for the holding bolts 34, as shown in Fig. 14.

A gear blank as at 40, is moved rectilinearly through the passage 29 in cutting relation with the broaches 30 and to this end any suitable power means may be provided, such as for example, hydraulic power means comprising a piston 41 and cylinder 42 which may be mounted on the base 21. The outer end of the cylinder 42 is provided with a passage 43 for passage of liquid under pressure to act against the piston 41 and the inner end of the cylinder 42 is closed by an end wall 44 which abuts an upright wall 45 of the base 21, the walls 44 and 45 being provided with aligning apertures to slidably receive and guide a push rod 46 which is connected to the piston 41. Carried by the push rod 46, a gear blank carrier 48 is provided and is slidable in guideways 49 which are positioned between the hydraulic power means and the cutting broaches or at what may be termed the loading station of the machine. As shown in Fig. 1 when the piston 41 is in retracted position, or prior to operation of the machine the gear blank carrier 48 is disposed at the loading station.

Referring now to the gear blank carrier 48 which is shown in detail in Fig. 9, this carrier preferably includes a pair of spaced supports or guide members 50 in which a shaft or arbor 51 is journaled for rotation, the arbor 51 being axially aligned with the push rod 46 and having a reduced pilot portion 52 received in a bored recess 53 in the end of the push rod 46. Carried by the rear guide member 50 is a pin 54 arranged to engage in a recess 55 in the push rod 46 to limit relative axial or longitudinal movement of the carrier and push rod. Interposed between the end of the push rod 46 and the rear guide member 50 of the carrier, a suitable thrust bearing 56 is preferably provided. Disposed between the spaced guide members 50, a pair of meshed gears 57, 58 are provided, gear 57 being keyed, as at 60, to the arbor 51 and gear 58 being freely rotatably mounted on a shaft 61 disposed above and parallel with the arbor 51, the shaft 61 having opposite end portions supported in opposed bored recesses 62 in the spaced guide members 50. The gear blank 40 is mounted on the outer or forward end of the arbor 51 and may be keyed or otherwise mounted to rotate with the arbor, and a spacer member or collar may be secured to the arbor between the gear blank and the front guide member 50.

On travel of the gear blank carrier 48 in cutting relation with the broaches 30, the freely rotatable gear 58 meshes with an elongated, stationary gear rack 63, Figs. 7 and 8, which rotates the arbor and gear blank 40 mounted thereon. The gear rack 63 extends longitudinally of and above the broaches 30 and may be rigidly secured in a downwardly facing recess 64 in the upper casting 23 by screws or by other suitable means. The gear blank carrier guide members 50 are formed with external extended portions 65 which slidably engage inner wall surfaces of the base 20 and castings 22, 23, to guide the carrier, the lower extended portion having a downwardly facing V-shaped wall surface which rides on the upwardly directed V-shaped wall 25 of the base 20.

Figures 12, 13:
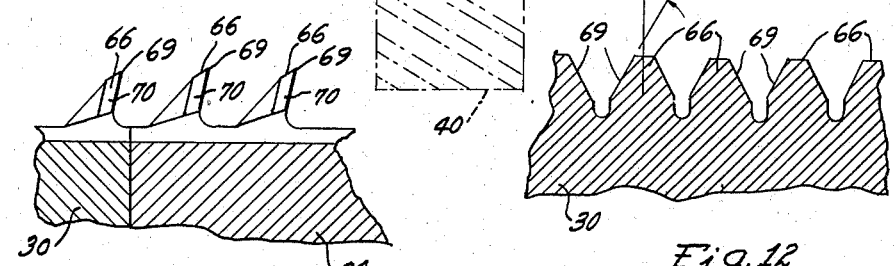
Fig. 12 is a sectional view of the cutting elements, taken along the line 12—12 of Fig. 11.
Fig. 13 is a view partly in elevation and partly in section of the cutting elements, taken along the line and in the direction of the arrows 13—13 of Fig. 11.

Referring now to Figs. 11, 12 and 13, the broaches shown have a plurality of rows of extended, spaced cutting elements 66 which project into the passage 27, or path of travel of the blank to be cut. These rows of cutting elements 66 are arranged at an angle to the axis of the gear blank, this angle being indicated by the letter $b$ on the drawing and is made equal to the helix angle at the selected generating circle of the gear to be cut. The center line 68, Fig. 11 is equidistant from the radially spaced broaches 30 and is coincident with the axis of rotation of the gear blank 40 which is rectilinearly moved in the direction indicated by the arrow. The cutting elements 66 are formed with sharpened cutting edges 69 along the top and along the angular sides 70, the angularity of the sides, or angle $a$ depending upon the selected pressure angle of the gear to be cut. The cutting elements are arranged longitudinally of the machine such that each does its share of cutting to provide for a uniform and gradual cutting away of material throughout the length of travel of the blank in cutting relation with the broaches. To this end, the broaches 30 may be equally spaced from the longitudinal center, or center 68 coincident with the axis of the gear blank, and the cutting elements may be formed so that they decrease in height from the entrance to the axis of the broach passage 27.

A plate or end wall 72 is mounted on the discharge end of the machine by bolts 73, or by other suitable means, and mounted on this plate, automatically operable mechanism is provided to unload the finished gears from the carrier 48. The plate 72 is provided with an opening 74 into which the front guide member 50 of the gear blank carriage 48, is adapted to position on completion of the hydraulic piston stroke, and overlying the opening 74 is a plate 75 which constitutes a part of the said gear unloading or removing mechanism and is slidable, transversely of the machine, in a recess provided in the fixed end plate 72. The slide plate 75 is provided with a slotted or elongated opening therethrough having a relatively large diameter at one end larger than the diameter of the finished gears and having a relatively small diameter at the other end, smaller than the finished gears. In one position of the plate 75 which may be termed a stripper plate, the larger opening of the slot is positioned to permit the finished gear to pass therethrough whereas in another position of the stripper plate the smaller opening is positioned such that the finished gear abuts the plate on retraction of the hydraulic piston stripping the gear from its supporting arbor 51. The stripper plate 75 is urged toward the right facing, Fig. 4, to the position to strip the finished gear from the arbor 51, by a helical coil spring 77 which is positioned in a recess 78 in the fixed end wall 72, the slide plate 75 having a transverse lug 80 projecting into the recess 78 and against one end of which the spring abuts.

Mounted on and carried by the slide plate 75 is a casing 82 containing a coil spring 83 and a plunger or latch 84, the latch urged by the spring 83 being adapted to engage in the opening 74 for releasably holding the slide plate 75 against movement by the spring 77. After the finished gear has passed through the opening in the slide or stripper plate 75, the front guide member 50 of the gear blank carrier engages and moves the plunger out of the opening 74 in the fixed end plate 72 after which the spring 77 is free to move the stripper plate to the position shown in full lines, Fig. 4, or in a position to strip the finished gear from the arbor. Movement of the stripper plate 75 by the spring 77 is limited by a stop member 85.

Carried by the front guide member 50, a cam 86 is provided to retract the stripper plate against the action of the spring 77 and projects through a rectangular opening 86a in the stripper plate. On its underside, the cam 86 is provided with a cam surface 87, angularly disposed and adapted to engage an angularly disposed abutment surface 88 of the stripper plate 75 to reposition the plate on retraction of the hydraulic piston.

In the operation of the machine, the operator mounts a gear blank on the arbor 51 and starts the hydraulic power means. The gear blank carrier enters the broach passage 27 and the carrier gear 58 meshes with the stationary gear rack 63, rotating the gear blank, the carrier guides 50 being held against rotation by its guides or slideways. As the gear blank travels through the passage 27 in cutting relation with the cutting elements 66, the cutting elements gradually cut away the metal since the teeth gradually increase in length toward the discharge end of the machine which as previously mentioned provides for a uniform cutting away of metal throughout the length of the cutting elements. Thus, all of the cutting elements 66 do their share of cutting away a predetermined amount of the metal from the gear blank until the gear is finished. In the operation of the machine the gear blank must make one complete revolution when it has traveled a distance equal to the lead of the helix of the gear being cut. After the gear cutting operation is completed, the finished gear passes through the opening 74 and the large part of the opening in the stripper plate after which, the front carriage guide member dislodges the latch 84 permitting the spring 77 to move the stripper plate to the right, Fig. 4. On retraction of the hydraulic piston 41, the finished gear abuts the stripper plate which strips it from the arbor and the finished gear may fall into a container or onto a conveyor, as desired.

It will now be seen that I have provided a new and improved machine for cutting spiral gears, and one by means of which gears may be made at a high rate of production. It is only necessary for an operator to place a gear blank on the gear carrier and start the machine after which the gear blank travels in cutting relation with the broaches to the end of the machine where the finished gear is removed from its carrier. Not only is the present machine capable of a high rate of gear production but is economical to manufacture and operate, for by the present arrangement of the broaches whereby all of the cutting elements do an equal share of the cutting, they will not require frequent sharpening or replacement.

While I have shown and described four rows of broaches, it will be understood that one or more rows of broaches can be employed without departing from the spirit and scope of my invention which is to be limited only by the appended claims.

What I claim is:

1. In a gear cutting apparatus, a plurality of elongated broaches, said broaches having cutting elements arranged to project laterally into a rectilinear path of travel of a gear blank to be cut and arranged for successively and uniformly cutting away the material of the gear blank to provide gear teeth on the external periphery of the blank; a movable carrier for the gear blank and arranged to move longitudinally of the broaches, power means to move said carrier, an arbor carried by and rotatable relative to said carrier and on which the gear blank is mounted to rotate therewith, a gear rack, gear means carried by said carrier and cooperable with said rack to rotate said arbor and blank on travel of the carrier during the cutting operation and guide means for said carrier and preventing rotation thereof.

2. In a gear cutting apparatus for cutting an external gear, a supporting means, a plurality of elongated longitudinally extending broaches spaced circumferentially to define a rectilinear path of travel of a gear blank to be cut, supporting means for said broaches, a reciprocal carrier for the gear blank and arranged to move along said path with the gear blank in cutting relation with the broaches, means to move said carrier, guide means preventing rotation of said carrier, and means operable during the cutting operation to rotate the gear blank.

3. In a gear cutting apparatus having a movable carrier for a gear blank to be cut, an automatically operable mechanism for removing the finished gear from the carrier comprising a stripper member movable to a position to strip the gear from the carrier, releasable means operable to move said stripper member, and means actuated by the carrier to release said moving means.

4. In a gear cutting apparatus having a reciprocal carrier for a gear blank to be cut, an automatically operable mechanism for removing the finished gear from the carrier comprising a stripper member movable between two positions, said stripper member in one position stripping the gear from the carrier on movement of the carrier in one direction, latch means operable to hold said stripper member in the other position and actuated on predetermined movement of the carrier in the other direction, and spring means operable to move said stripper member to said one position on release of said latch means.

5. In a gear cutting apparatus having a movable carrier for a gear blank to be cut, means for removing the finished gear from the carrier comprising, a stripper member shiftable between effective and ineffective positions, said stripper member in its effective position stripping the gear from the carrier on movement of the carrier in one direction, means acting to move said stripper member to its effective position, and releasable means restraining said last-named means.

6. In a gear cutting apparatus having a movable carrier for a gear blank to be cut, mechanism for removing the finished gear from the carrier comprising a stripper plate shiftable between two positions, said stripper plate having an opening through which the gear will pass only when said stripper plate is in one of said positions, means acting to move said stripper plate to said one position, and latch means restraining said last-named means and releasable in accordance with movement of said carrier.

7. In a gear cutting apparatus having a movable carrier for a gear blank to be cut, means for stripping the finished gear from the carrier comprising, a stripper member movable between two positions, said stripper member in one of said positions abutting and stripping the gear from said carrier upon movement of the carrier in one direction, force exerting means acting to move said stripper member to said one position, and releasable holding means restraining said force exerting means and carried by said stripper member.

8. In a gear cutting apparatus having a movable carrier for a gear blank to be cut, means for stripping the finished gear from the carrier comprising, a stripper member movable between two positions, said stripper member in one of said positions abutting and stripping the gear from said carrier upon movement of the carrier in one direction, force exerting means acting to move said stripper member to said one position, latch means restraining said force exerting means and holding said stripper member in the other of said positions, said latch means being releasable in accordance with movement of the carrier member, and means for returning said stripper member to the other of said positions.

RAYMOND L. MATTSON.